UNITED STATES PATENT OFFICE.

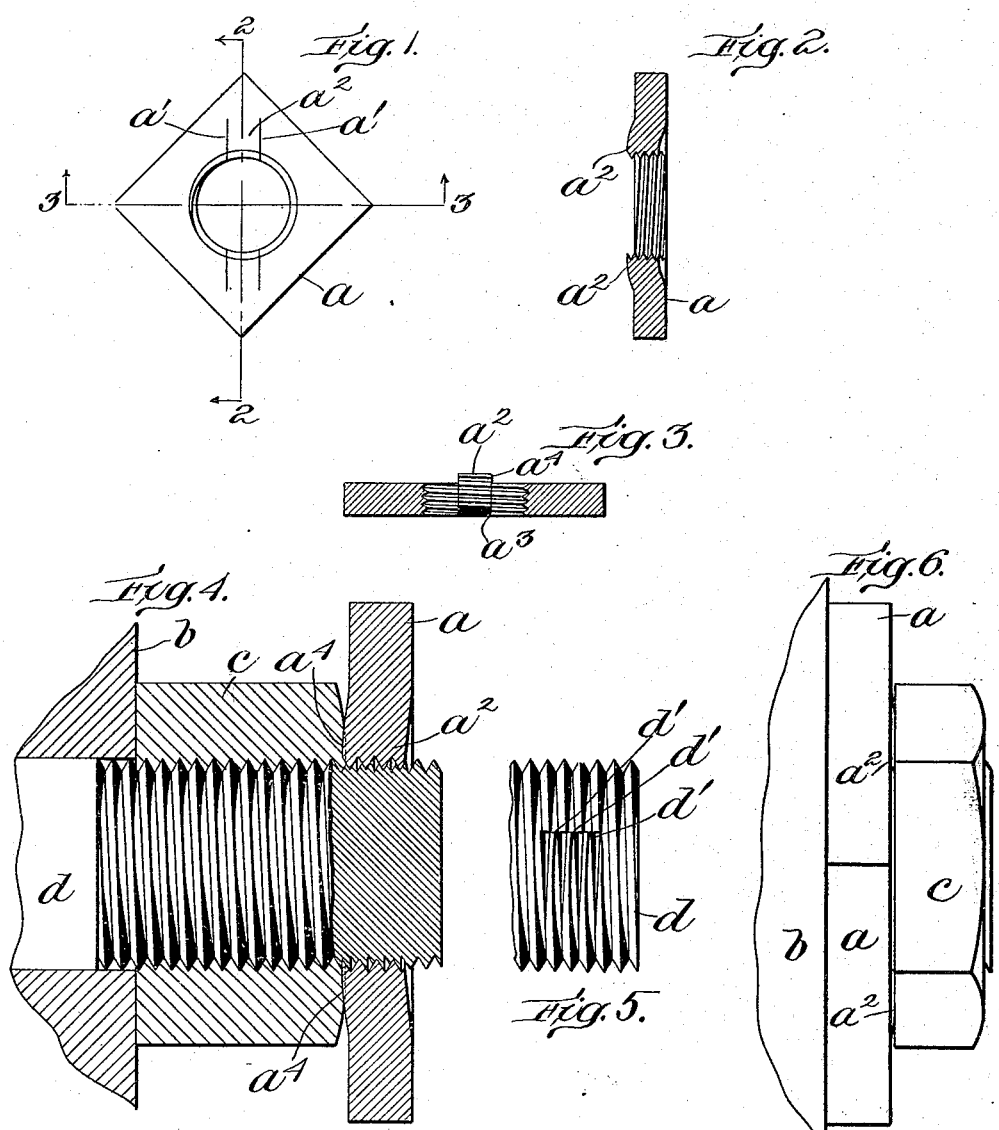

ARTHUR L. GODDARD, OF ROCKFORD, ILLINOIS.

NUT-LOCK.

1,199,888.   Specification of Letters Patent.   Patented Oct. 3, 1916.

Application filed July 26, 1909. Serial No. 509,638.

*To all whom it may concern:*

Be it known that I, ARTHUR L. GODDARD, citizen of the United States, and resident of Rockford, county of Winnebago, Illinois, have invented certain new and useful Improvements in Nut-Locks, of which the following is a specification.

This invention relates to means for locking nuts against accidental rotation and is intended to provide a simple, efficient and thoroughly reliable means by which a nut may be locked in any desired position on the bolt and may be held positively against working loose while making it possible to remove the nut when it is desired to do so.

A further object of the invention is to provide a locking device of the character described capable of being applied to the bolt either in advance of or behind the nut which it is desired to lock and which device is also capable of being used independently if desired, without any additional nut or holding means.

In the drawings I have illustrated a preferred form of embodying the principles of my aforesaid invention, Figure 1 being an end or face view of said nut; Fig. 2 being a central cross section on the plane indicated by line 2—2 of Fig. 1; Fig. 3 being a central cross section on the plane indicated by line 3—3 of Fig. 1. Fig. 4 is a vertical central section showing the application of the lock nut to hold an ordinary nut in place. Fig. 5 is a face view of a portion of the bolt showing how the threads are laterally displaced by the lock nut. Fig. 6 is a side elevation showing the lock nut applied in advance of the ordinary nut.

In the practice of this invention I provide a spring metal, preferably spring steel, disk $a$ which is preferably of polygonal form and which is centrally bored, as in the case of an ordinary nut, except that I prefer to make the bore slightly larger in internal diameter than the root diameter of the bolt to which it is to be applied for reasons hereinafter explained.

By means of slots $a'$ extending from the bore partly to the periphery of the nut lock or disk $a$, I partly sever a portion $a^2$ of the lock nut from the rest of the disk, said partly severed portion being offset adjacent to the bore, as shown in Figs. 2 and 3. Both the offset portion and the main body portion are formed with an internal screw thread conforming throughout to the pitch of the thread of the bolt to which it is to be applied, this being effected by tapping the internal thread after the locking jaw $a^2$ has been offset laterally to the face of the lock nut or in an axial direction, so that the threads of the main portion and the offset portion are continuous.

The mode of applying the device is illustrated in Fig. 4, in which $b$ represents the work or part engaged by the bolt, $c$ represents the usual holding nut while the locking member $a$ is screwed on after the nut $c$ has been turned to place. Since the jaws $a^2$, by reason of their partial severance from the main body portion of the disk, are capable of an independent lateral or axial movement, it will be clear that when the locking member is turned up against the outer face of the nut $c$ to engage therewith, the further rotation of the locking member $a$ will serve to crowd the threads of the bolt $d$ laterally of the nut or longitudinally of the bolt, so that they will be partly swaged into the offset positions shown at $d'$. These offset portions $d'$ of the thread are thus forced behind the shoulders formed by those portions of the threads of the main portion of the disk that have just passed beyond the portions $d'$ that are thus displaced so as to form shoulders partly abutting against the shoulders $a^3$ of the body portion of the nut lock. These abutments or shoulders formed by the displaced threads, form a positive locking means for preventing the loosening of the nut. At the same time the sharp edge $a^4$ of the offset member or jaw $a^2$ scrapes up or digs out a shaving on the opposed face of the relatively softer nut $c$ so as as to form an interlocking engagement therewith, as shown in Fig. 4.

It will be obvious that in light work where a heavy nut is not needed, the ordinary nut may be dispensed with and the locking nut $a$ may be screwed directly up against the work $b$, in which case it has precisely the same action as when screwed up against the nut $c$. It is also clear that the same lateral swaging effect upon the screw threads of the bolt will be secured if the lock nut $a$ be turned on to the bolt in advance of the ordinary nut, in which case of course the lock nut $a$ would be reversed so that its offset jaw would be on the back side instead of on the forward side. In this case the lateral swaging of the threads would be accomplished not by the turning of the lock nut but by the turning of the nut $c$ up against the offset jaw $a^2$ so as to force it in an axial direction across the threads of the bolt. Hence, it will be seen that the rotation of either the locking member itself or of its opposed member will produce the same effect. As it is not necessary or desirable to displace the bolt threads to the extent of their entire depth, the lock nut is preferably bored out somewhat larger than the root diameter of the bolt so that its internal threads engage the upper portions of the bolt threads but do not extend to the bottom of the thread grooves. This renders it easier to cause the lateral displacement of the threads and also makes it practicable to swage the displaced portions of the bolt threads back to their original position by turning back or reversely rotating the locking member by means of a wrench so that the bolt and nut may be used repeatedly since the reverse rotation restores the laterally offset threads to their normal position. While a single offset or locking jaw may serve the purpose, I have in this case shown the nut with diametrically opposed locking jaws as being on some accounts a more convenient form of the invention for practical use.

What I claim is:—

1. A device of the class described comprising a bolt, a metal polygonal disk provided with an internal bore of slightly larger diameter than the root diameter of the bolt to which it is to be applied, and having a portion of the entire thickness of the disk adjacent to the bore axially offset in relation to the remainder of the disk, the bore being tapped to form a screw thread of continuous pitch through the main and offset portions whereby the turning of the disk or its adjacent engaging member causes said offset portion to axially displace the bolt threads engaged by it, in order to prevent backing off substantially as described.

2. A device of the class described embracing in its construction the combination with a bolt, of a disk or locking nut provided with a central bore and having adjacent severing slots extending from said bore outwardly and from end to end thereof to form a yielding jaw which is offset from the face of the disk adjacent to the bore, said bore being formed with an internal screw thread conforming throughout both the main portion and the offset portion to the pitch of the thread of the bolt to which it is to be applied whereby external pressure against said off-set jaw in an axial direction causes said offset jaw to move axially and displace that portion of the bolt threads engaged by it substantially as described.

3. The combination of a bolt, a member engaged thereby, a locking member of spring metal formed with a central bore, a portion of which is partially severed from the remainder by adjacent slits parallel to the axis of the bore and offset axially therefrom, both the main and the offset portions being formed with a continuous screw thread conforming to the pitch of the thread of the bolt whereby the rotation of either of said members against the other acts to displace a portion of the bolt threads engaged by the offset portion of the locking member to form a positive lock against rotation substantially as described.

4. A nut lock embracing in its construction a bolt, a polygonal disk formed with a central bore, the disk being slotted through its entire thickness from the bore outward, said slots terminating short of the periphery so as to form a spring tongue, said spring tongue being offset in an axial direction with relation to the main body portion of the disk, both the main portion and the offset portion being formed with a uniform and continuous screw thread conforming to the thread of the bolt whereby upon tightly screwing the disk and the nut against each other the axial movement of the spring tongue causes an axial displacement of the bolt threads by which the disk is held positively against rotation, substantially as described.

In witness whereof, I have subscribed the above specification.

ARTHUR L. GODDARD.

In the presence of—
FRANK S. HORNER,
CHARLES F. HORNER.

Copies of this patent may be obtained for five cents each, by addressing the "Commissioner of Patents, Washington, D. C."